US000001117H

United States Statutory Invention Registration [19]

[11] Reg. Number: H1117

[43] Published: Dec. 1, 1992

Stanek

[54] VARIABLE EXPANSION SIZING RING

[75] Inventor: Tom G. Stanek, Roswell, Ga.

[73] Assignee: W. R. Grace & Co.-Conn., Duncan, S.C.

[21] Appl. No.: 872,261

[22] Filed: Apr. 9, 1992

[51] Int. Cl.[5] ..... A22C 11/02

[52] U.S. Cl. ..... 452/38

*Primary Examiner*—Harold J. Tudor

*Attorney, Agent, or Firm*—William D. Lee, Jr.; Mark B. Quatt; Jennifer L. Skord

[57] ABSTRACT

A sizing ring suitable for use with a tubular casing and a stuffing horn includes a cylindrical sleeve portion and a frustoconical portion, and an adjustable air bladder disposed around the frustoconical portion.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VARIABLE EXPANSION SIZING RING

FIELD OF THE INVENTION

The present invention relates to a sizing ring, preferably a sizing ring for casings in which liquid smoke or colorants may be introduced to the interior of a food casing.

BACKGROUND OF THE INVENTION

It is well known in the food packaging art to stuff synthetic or cellulosic tubular casings with various meat products. These products are typically processed and introduced into the casings in the form of an emulsion or comminuted form.

In automated processes, processed meat products are typically introduced into a shirred casing. This is a casing which is shirred to a much shorter length than the actual length of the casing. As the automated process is operated, the shirred casing is fed typically over a sizing ring which unshirres the casing before stuffing with the meat product. Of course, the diameter of the sizing ring will be predetermined in accordance with the size of the intended casing which will be used for the particular packaging operation.

In using a standard sizing ring for a food casing, tensioning of the casing to avoid air voids and maintain stuff diameter is difficult. Casing dimensions can vary, requiring the substitution of another, "better fitting" ring.

It is also common practice to introduce liquid smoke, colorant, or other similar additives to certain processed meat products such as sausage or luncheon meats to impart the desired flavor or color to the food product. These additives are usually blended into the food product before the stuffing operation, or impregnated into the casing material itself if the composition of the casing permits impregnation of such additives.

This common practice requires an additional step prior to the stuffing operation. In the case of pre-blending the colorant or liquid smoke into the food product, sometimes more additive is used than is really required. For example, if only the surface of the food product requires the colorant or liquid smoke, pre-blending uses excess additive which is blended throughout the food product.

Additionally, in the case of some synthetic casings, liquid smoke and colorant are not easily added to the casing material itself, and if added are not readily retained by the casing material.

For these reasons, it is desirable to provide a method and apparatus for coating the exterior of a processed meat product, packaged in a casing, which does not require the pre-blending of the additive before the stuffing operation, or impregnation of the casing material itself with the additive.

U.S. Pat. No. 4,958,412 (Stanek) discloses a sizing ring in which a channel located within a cylindrical sleeve portion allows for the transfer of a liquid additive to the outer extremity of the sizing ring. Grooves in the outer face of the ring transmit the additive from the ring onto the interior of the casing as it is unshirred. The liquid additive is then transferred to the exterior surface of the stuffed meat or other product.

Using the color ring described in U.S. Pat. No. 4,958,412 to deposit color or liquid smoke on the interior surface of a shirred casing makes certain demands on the packaging system. In addition to the considerations for standard rings, some standard tensioning devices, located downstream of the sizing ring on the front end discharge of the stuffing horn, can undesirably wick away the color deposited at the ring.

It is an object of the present invention to offer a solution to the problems of casing size variation, and color removal in the case of color rings.

SUMMARY OF THE INVENTION

A sizing ring suitable for use with a tubular casing and a stuffing horn comprises a cylindrical sleeve portion and a frustoconical portion, and an adjustable air bladder disposed around the frustoconical portion.

BRIEF DESCRIPTION OF THE DRAWINGS

The invention may be further understood by reference to the following figure drawings, given by way of illustration only.

DESCRIPTION OF THE PREFERRED EMBODIMENTS

Figure 1:
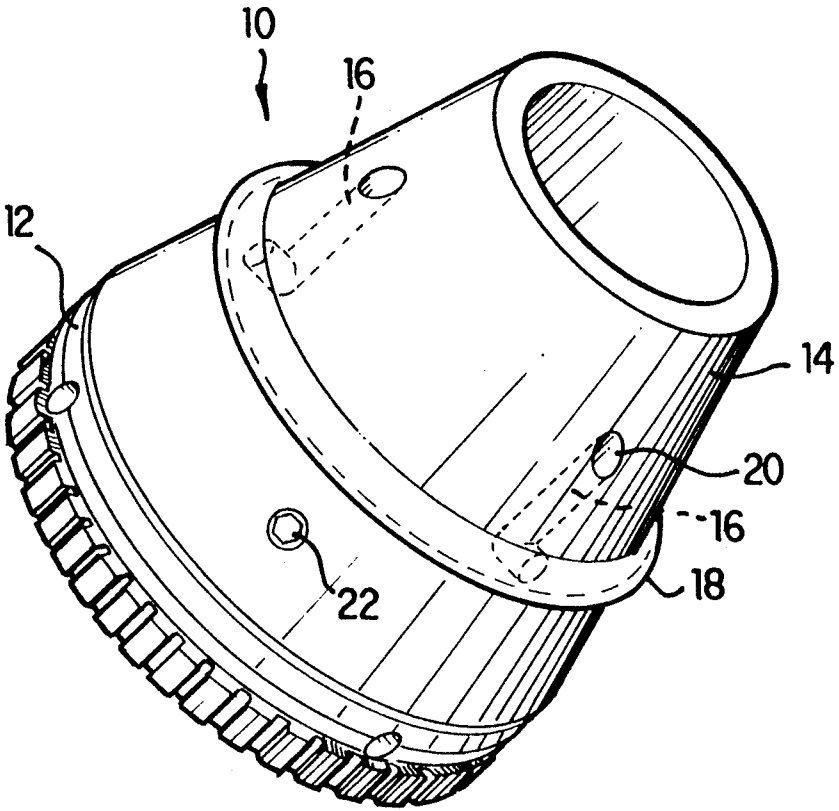
FIG. 1 is a perspective view of a sizing ring in accordance with the present invention.

Referring to FIG. 1, a sizing ring 10 has a cylindrical portion 12 and a frustoconical portion 14. Typically, one or a plurality of set screws 22 is used to initially install the sizing ring to the stuffing horn or a support sleeve. A sizing ring of this general configuration has been commercially available from the Cryovac division of W. R. Grace & Co.-Conn.

Figure 2:
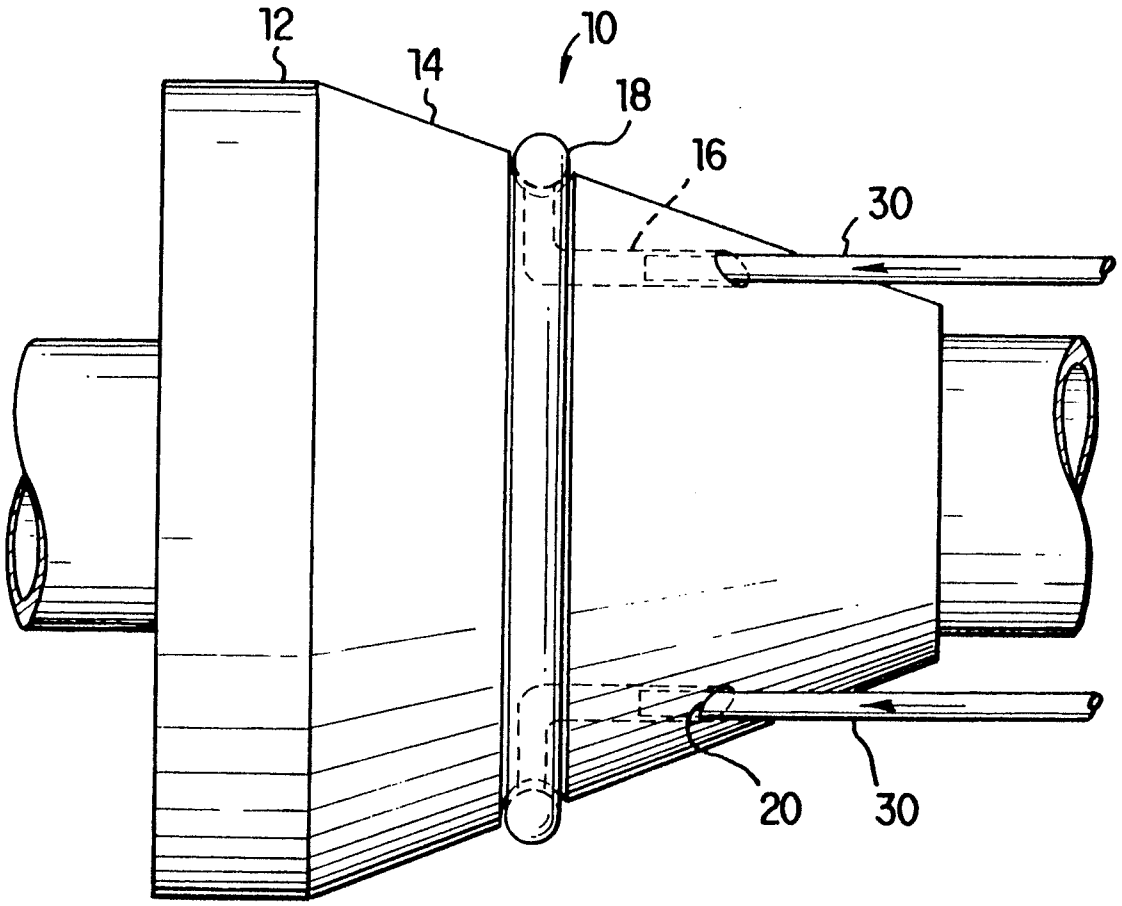
FIG. 2 is a side view of a sizing ring in accordance with the present invention.

The inventor has discovered that by introducing one or more air channels 16 in the interior of the ring, as indicated partially in phantom lines in FIGS. 1 and FIGS. 2, an adjustable air bladder 18 disposed around the circumference of the frustoconical portion 14 can be variably expanded. This allows a machine operator to adjust casing tension as casing widths vary, reducing the need for changing sizing rings. In rings of the type disclosed in U.S. Pat. No. 4,958,412, it also eliminates or reduces the need for tensioning devices at the discharge end of the stuffing horn. Such tensioning devices can wipe away color previously applied to the inside of the casing.

Referring to FIG. 2, further details of the sizing ring in accordance with the present invention are seen.

The present invention operates on the basis of a conventional source (not shown) of air or other gas delivered through tubing 30, through orifices 20 of the sizing ring, through the interior of channels 16 and up into an adjustable, expandable bladder 18. Varying the air pressure in the bladder will adjust the degree of expansion of the bladder to affect the tension on the casing as it is unshirred. It is preferable that a plurality of tubing 30, orifices 20, and channels 16 are utilized to better distribute the air. In the most preferred embodiment, three tubes 30, orifices 20, and channels 16 described above are utilized, being distributed at an equal spacing around the circumference of the sizing ring.

The shirred casing itself is well known in the art, and various means have been devised to install sections of shirred casing onto stuffing horns, or alternatively onto a support sleeve which has in turn been installed on a stuffing horn. Those skilled in the art will readily recognize the adaptability of the present invention to various stuffing assemblies and apparatus.

In an alternative embodiment, a sizing ring in accordance with the present invention comprises in the alternative a cylindrical sleeve or a frustoconical portion, and an adjustable air bladder.

Those skilled in the art will readily understand that other modifications may be utilized with varying success. For example, more than one bladder can be used, and the bladder can be positioned at various positions on the sizing ring. These and other modifications are deemed to be within the spirit and scope of the claim as defined below.

What is claimed is:

1. A sizing ring suitable for use with a tubular casing and a stuffing horn comprising a cylindrical sleeve portion and a frustoconical portion, and an adjustable air bladder disposed around the frustoconical portion.

* * * * *